(12) United States Patent
Do

(10) Patent No.: US 10,378,256 B2
(45) Date of Patent: Aug. 13, 2019

(54) PRESSURE RELIEF LATCH

(71) Applicant: Arconic Inc., Pittsburgh, PA (US)

(72) Inventor: Thai Do, Laguna Niguel, CA (US)

(73) Assignee: Arconic Inc., Pittsburgh, PA (US)

( * ) Notice: Subject to any disclaimer, the term of this patent is extended or adjusted under 35 U.S.C. 154(b) by 243 days.

(21) Appl. No.: 15/337,232

(22) Filed: Oct. 28, 2016

(65) Prior Publication Data

US 2017/0122015 A1    May 4, 2017

Related U.S. Application Data

(60) Provisional application No. 62/248,355, filed on Oct. 30, 2015.

(51) Int. Cl.
*E05C 19/02*    (2006.01)
*B64D 29/08*    (2006.01)
(Continued)

(52) U.S. Cl.
CPC .............. *E05C 19/02* (2013.01); *B64D 29/00* (2013.01); *B64D 29/08* (2013.01); *E05B 15/04* (2013.01);
(Continued)

(58) Field of Classification Search
CPC ......... Y10T 292/0929; Y10T 292/0932; Y10T 292/0936; Y10T 292/0946;
(Continued)

(56) References Cited

U.S. PATENT DOCUMENTS 1,206,342 A    11/1916    Linborg
2,712,955 A    7/1955    Andrews
(Continued)

FOREIGN PATENT DOCUMENTS

CN    102191876 A    9/2011
CN    104929449 A    9/2015
(Continued)

OTHER PUBLICATIONS

International Search Report and Written Opinion issued by the European Patent Office in International Patent Application No. PCT/US2016/059313 filed Oct. 28, 2016.
(Continued)

*Primary Examiner* — Alyson M Merlino
(74) *Attorney, Agent, or Firm* — Greenberg Traurig, LLP

(57) ABSTRACT

A latch having a housing and a latch mechanism located within an interior portion of the housing. The latch mechanism includes an arm, a pair of socket screws, a pair of torsion springs, each of which is connected rotatably to the arm and engages a corresponding one of the pair of socket screws, a bolt mechanism attached rotatably to the housing, and a link attached pivotally to the arm and attached to the bolt mechanism. The socket screws are utilized to adjust loads on the springs. The bolt mechanism is movable between a first position, in which the arm and the link are toggled with one another under the loads of the springs and the bolt mechanism is adapted to engage an external structure, and a second position, in which the link and the arm are untoggled with one another and the bolt mechanism is disengaged with the external structure.

10 Claims, 4 Drawing Sheets

(51) Int. Cl.
*B64D 29/00* (2006.01)
*E05B 15/04* (2006.01)
*E05B 51/02* (2006.01)
*E05B 63/00* (2006.01)
*E05B 85/02* (2014.01)

(52) U.S. Cl.
CPC ........ *E05B 51/023* (2013.01); *E05B 63/0056* (2013.01); *E05B 85/02* (2013.01); *E05B 2015/0455* (2013.01)

(58) Field of Classification Search
CPC ......... Y10T 292/0949; Y10T 292/1055; Y10T 292/1059; Y10T 292/1062; Y10T 292/1076; Y10T 292/108; Y10T 292/20; Y10T 292/202; Y10T 292/216; Y10T 292/0917; Y10S 292/11; Y10S 292/31; Y10S 292/49; E05C 19/02; E05C 19/00; E05C 19/10; E05C 19/12; E05C 19/14; E05C 19/145; E05B 15/04; E05B 15/0086; E05B 51/023; E05B 63/0056; E05B 85/02; E05B 2015/041; E05B 2015/0455; E05B 65/102; B64D 29/00; B64D 29/06; B64D 29/08
See application file for complete search history.

(56) References Cited

U.S. PATENT DOCUMENTS

| | | | |
|---|---|---|---|
| 2,726,889 A | 12/1955 | Lawson | |
| 2,904,141 A | 9/1959 | Henrichs | |
| 2,927,812 A * | 3/1960 | Smith | E05C 3/122 292/196 |
| 2,944,848 A | 7/1960 | Mandolf | |
| 3,070,395 A | 12/1962 | Morrison et al. | |
| 3,214,207 A * | 10/1965 | Swanson | E05C 19/145 292/66 |
| 3,259,411 A | 7/1966 | Griffiths | |
| 3,259,412 A | 7/1966 | Wheeler | |
| 3,341,239 A | 9/1967 | Wheeler | |
| 3,347,578 A | 10/1967 | Sheehan et al. | |
| 3,473,693 A | 10/1969 | Fritz | |
| 3,571,977 A | 3/1971 | Abeel | |
| 3,743,335 A * | 7/1973 | Reilhac | E05B 83/24 292/127 |
| 3,917,327 A | 11/1975 | Plasko | |
| 4,053,177 A | 10/1977 | Stammreich et al. | |
| 4,099,751 A | 7/1978 | Poe et al. | |
| 4,116,479 A | 9/1978 | Poe | |
| 4,130,307 A | 12/1978 | Poe et al. | |
| 4,159,137 A * | 6/1979 | Richter | E05C 3/08 292/123 |
| 4,183,564 A | 1/1980 | Poe | |
| 4,220,364 A | 9/1980 | Poe | |
| 4,230,352 A * | 10/1980 | Sealey | E05B 65/102 292/18 |
| RE31,935 E | 7/1985 | Poe | |
| 4,530,529 A | 7/1985 | Poe et al. | |
| 4,538,843 A | 9/1985 | Harris | |
| 4,602,812 A | 7/1986 | Bourne | |
| 4,641,868 A | 2/1987 | Miron | |
| 4,826,221 A | 5/1989 | Harmon | |
| 4,828,299 A | 5/1989 | Poe | |
| 4,858,970 A * | 8/1989 | Tedesco | E05C 19/145 292/113 |
| 4,911,488 A | 3/1990 | Brackmann et al. | |
| 4,925,221 A * | 5/1990 | Carmody | E05C 3/08 292/196 |
| 5,152,926 A | 10/1992 | Brown | |
| 5,228,730 A | 7/1993 | Gokcebay et al. | |
| 5,341,752 A | 8/1994 | Hambleton | |
| 5,609,373 A | 3/1997 | Gromotka | |
| 5,620,212 A | 4/1997 | Bourne et al. | |
| 5,660,295 A | 8/1997 | Hroma et al. | |
| 5,664,813 A | 9/1997 | Gromotka | |
| 5,984,382 A * | 11/1999 | Bourne | E05C 19/145 292/113 |
| 6,042,156 A * | 3/2000 | Jackson | E05C 19/145 292/247 |
| 6,123,370 A | 9/2000 | Rozema et al. | |
| 6,343,815 B1 * | 2/2002 | Poe | E05C 19/145 292/113 |
| 6,361,090 B1 | 3/2002 | Fan | |
| 6,755,448 B2 | 6/2004 | Jackson et al. | |
| 6,913,297 B2 | 7/2005 | Jackson et al. | |
| 7,029,038 B2 | 4/2006 | Kobrehel | |
| 7,156,429 B2 | 1/2007 | Eriksson | |
| 7,504,601 B2 | 3/2009 | Belmond et al. | |
| 7,857,362 B2 | 12/2010 | Deblock | |
| 8,479,543 B2 | 7/2013 | Yang et al. | |
| 8,646,819 B2 | 2/2014 | Do et al. | |
| 8,727,390 B2 | 5/2014 | Do | |
| 8,864,185 B2 | 10/2014 | Do | |
| 9,353,559 B2 | 5/2016 | Fabre et al. | |
| 2002/0000726 A1 | 1/2002 | Zintler | |
| 2002/0060459 A1 | 5/2002 | Zintler | |
| 2005/0087996 A1 | 4/2005 | Jackson et al. | |
| 2006/0214431 A1* | 9/2006 | Helsley | E05C 19/14 292/113 |
| 2008/0129056 A1* | 6/2008 | Hernandez | E05C 19/14 292/98 |
| 2011/0109103 A1 | 5/2011 | Huston et al. | |
| 2012/0102842 A1 | 5/2012 | Fournie et al. | |
| 2012/0151724 A1 | 6/2012 | DeFrance et al. | |
| 2015/0184543 A1 | 7/2015 | Fabre et al. | |
| 2015/0184544 A1 | 7/2015 | Fabre et al. | |
| 2015/0232189 A1* | 8/2015 | Hernandez | E05B 51/023 292/200 |

FOREIGN PATENT DOCUMENTS

| | | |
|---|---|---|
| CN | 206174718 U | 5/2017 |
| DE | 202220 C | 9/1908 |
| DE | 29807738 U1 | 7/1998 |
| EP | 1091059 A2 | 4/2001 |
| EP | 1270406 A2 | 1/2003 |
| EP | 2031157 A1 | 3/2009 |
| EP | 2907946 A1 | 8/2015 |
| FR | 2397503 A1 | 2/1979 |
| FR | 2852049 A1 | 9/2004 |
| GB | 191493 A | 1/1923 |
| GB | 1497982 A | 1/1978 |
| GB | 1537410 A | 12/1978 |
| WO | 2006/100654 A2 | 9/2006 |
| WO | 2006/100654 A3 | 9/2006 |
| WO | 2010033026 A1 | 3/2010 |
| WO | 2010149905 A1 | 12/2010 |

OTHER PUBLICATIONS

Aerospace Latching Systems, Alcoa Fastening Systems, http://www.alcoa.com/fastening_systems/aerospace/en/product.asp?cat_id=213&prod_id=500,pp. I1-2, 159-60, and i-iii (8 pages).
Fairchild Fasteners, Aerospace Mechanisms, "RAM™ Aerospace Latch Mechanism", 2000 (4 pages).
Rotary Latch #TL18261, Alcoa Fastening Systems, Mar. 2005 (1 page).
English-language translation of WO 2010/149905 A1 (8 pages).
International Search Report and Written Opinion dated Jul. 20, 2012, issued by the European Patent Office in connection with International Patent Application No. PCT/US2012/028418 entitled "Pin Latch Having Intermediate Position" (13 pages).
International Search Report and Written Opinion dated Jan. 18, 2013, issued by the European Patent Office in connection with International Patent Application No. PCT/US2012/059206 entitled "Rotary-Handle Latch" (9 pages).
International Search Report and Written Opinion dated Feb. 25, 2013, issued by the European Patent Office in connection with International Patent Application No. PCT/US2012/066039 entitled

(56) References Cited

OTHER PUBLICATIONS

"Pin Latch With Detection Device and Movable Catch-Pin and Intermediate Position With Automatic Return Mechanism" (15 pages).
International Search Report and Written Opinion dated Dec. 29, 2011, issued by the European Patent Office in connection with International Patent Application No. PCT/US2011/027871 entitled "Latch With Adjustable Handle" (17 pages).
International Search Report and Written Opinion dated Jul. 15, 2011, issued by the European Patent Office in connection with International Patent Application No. PCT/US2011/027671 entitled "Latch With Adjustable Handle" (8 pages).
International Search Report and Written Opinion dated Jun. 7, 2011, issued by the European Patent Office in connection with International Patent Application No. PCT/US2011/024031 entitled "Side-Driven Action Pin Latch" (9 pages).
International Search Report and Written Opinion dated Jun. 9, 2016, issued by the European Patent Office in connection with International Patent Application No. PCT/US2016/024836 (13 pages).
Alcoa Fastening Systems, Document TL22028 Rev. P, dated Jun. 18, 2015 (2 pages).
Alcoa Fastening Systems, Document TL18356 Rev. D, dated Jul. 7, 2015 (2 pages).
Alcoa Fastening Systems, Document TL22013 Rev. K, dated Jul. 13, 2015 (4 pages).

\* cited by examiner

PRESSURE RELIEF LATCH

CROSS-REFERENCE TO RELATED APPLICATION

This application is a § 111(a) application that relates to and claims the benefit of commonly-owned, co-pending U.S. Provisional Patent Application Ser. No. 62/248,355, filed Oct. 30, 2015, entitled "FINE-TUNED, ADJUSTABLE LOAD, TOGGLE PRESSURE RELIEF LATCH," the entirety of which is incorporated herein by reference.

FIELD OF THE INVENTION

The present invention relates to latches and, more particularly, to fine-tuned, adjustable load, toggle pressure relief latches.

BACKGROUND OF THE INVENTION

Removable and moveable elements installed on exterior surfaces of aerospace vehicles, such as hatches, doors, access panels, engine cowlings, nacelles, and radomes employ latches. What is desirable is a latch that has an adjustable, fine-tuned pressure relief load.

SUMMARY OF THE INVENTION

In an embodiment, a latch includes a housing having a top end, a bottom end opposite the top end, a front wall extending from the top end to the bottom end, a rear wall opposite the front wall and extending from the top end to the bottom end, a pair of sidewalls, each of which extends from the top end to the bottom end and between the front wall and the rear wall, and a floor located at the bottom end and extending between the front wall, the rear wall, and the sidewalls, the front wall, rear wall, the pair of sidewalls, and the floor forming an interior portion; and a latch mechanism located within the interior portion of the housing, the latch mechanism including an arm, a pair of socket screws, each of which is positioned rotatably within the rear wall of the housing, a pair of torsion springs, each of which is connected rotatably to the arm and engages a corresponding one of the pair of socket screws, a bolt mechanism attached rotatably to the housing proximate to the rear wall and having a first end and a second end opposite the first end, and a link having a first end and a second end opposite the first end of the link, the first end of the link being attached pivotally to the arm, and the second end of the link being attached to the bolt mechanism, wherein each of the pair of socket screws being adapted to adjust a load on a corresponding one of the torsion springs, and wherein the bolt mechanism is movable rotatably between a first position, in which the arm and the link are toggled with one another under the loads from the pair of torsion springs and the first end of the bolt mechanism is adapted to engage an external structure, and a second position, in which the link and the arm are untoggled with one another and the first end of the bolt mechanism is disengaged with the external structure.

In an embodiment, the housing includes a pair of ledges, one of the pair of ledges being located between and extends from a first corner formed by one of the pair of sidewalls, the rear wall, and the floor of the housing, and the other of the pair of ledges being located between and extends from a second corner formed by the other of the pair of sidewalls, the rear wall, and the floor of the housing, and wherein one of the pair of torsion springs rests on one of the pair of ledges, and the other of the pair of torsion springs rests on the other of the pair of ledges. In an embodiment, the housing includes a pair of holes formed within the front wall thereof, one of the pair of holes being located within one of the pair of ledges, and the other of the pair of holes being located within the other of the pair of ledges, and wherein each of the pair of holes being sized and shaped to receive a corresponding one of the pair of socket screws. In an embodiment, the arm includes a middle portion having a pair of side members extending outwardly and opposed to one another and a slot formed between the side members, the slot being sized and shaped to receive the first end of the link.

In an embodiment, the latch mechanism include a pair of bushings, each of the pair of torsion springs being positioned around a corresponding one of the bushings, and wherein the bushings are connected to the middle portion of the arm by a rivet. In an embodiment, each of the pair of torsion springs includes a first leg and a second leg, the first leg of each of the pair of torsion springs engages its corresponding one of the pair of the socket screws, and the second leg of each of the pair of torsion springs engages a corresponding one of side members of the arm. In an embodiment, each of the socket screws includes a periphery and a plurality of holes formed within the periphery, each of the plurality of holes being sized and shaped to receive a lock wire.

In an embodiment, the bolt mechanism includes a bolt positioned at the first end of the bolt mechanism, and a nut engaged threadedly with the bolt for adjusting the position of the bolt. In an embodiment, the second end of the bolt mechanism includes a slot formed therein and sized and shaped to receive an external tool for manually rotating the bolt mechanism. In an embodiment, the housing includes at least one mounting bracket. In an embodiment, the housing includes a pair of mounting brackets. In an embodiment, the housing includes a pair of support brackets, one of which extends obliquely from the rear wall and the bottom end to the top end and one of the mounting brackets proximate to one of the sidewalls, and the other of which extends obliquely from the rear wall and the bottom end to the top end and one of the mounting brackets proximate to other of the sidewalls. In an embodiment, the rear wall includes an opening positioned between the support brackets, the opening being sized and shaped to enable movement of the bolt mechanism between its first position to its second position.

In an embodiment, the latch is a fine-tuned/adjustable load, toggle-pressure relief latch which provides a fine-tuned load-range capability. The latch ensures a door of a structure can be opened when a high pressure is built up so as to prevent any loss of an internal component housed within the structure, such as an aircraft engine. The latch can be fine-tuned to a required load at an assembly level. In an embodiment, the latch is adapted for use in the aerospace field, such as aerospace doors, nacelles, etc. In other embodiments, the latch can be used in other fields and applications.

DETAILED DESCRIPTION OF THE DRAWINGS

Figure 1:
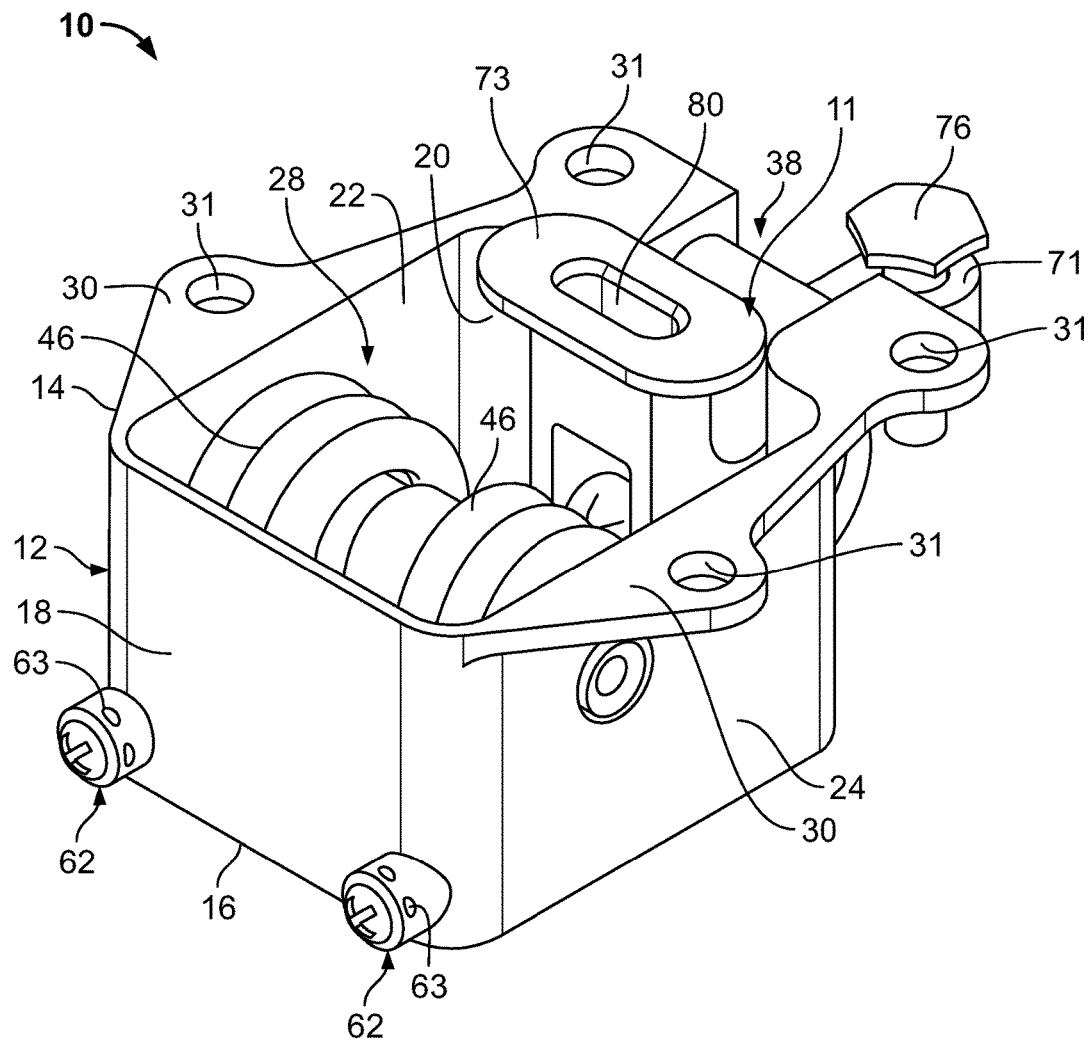
FIG. 1 is a top perspective view of a pressure relief latch in accordance with an embodiment.
Figure 2:
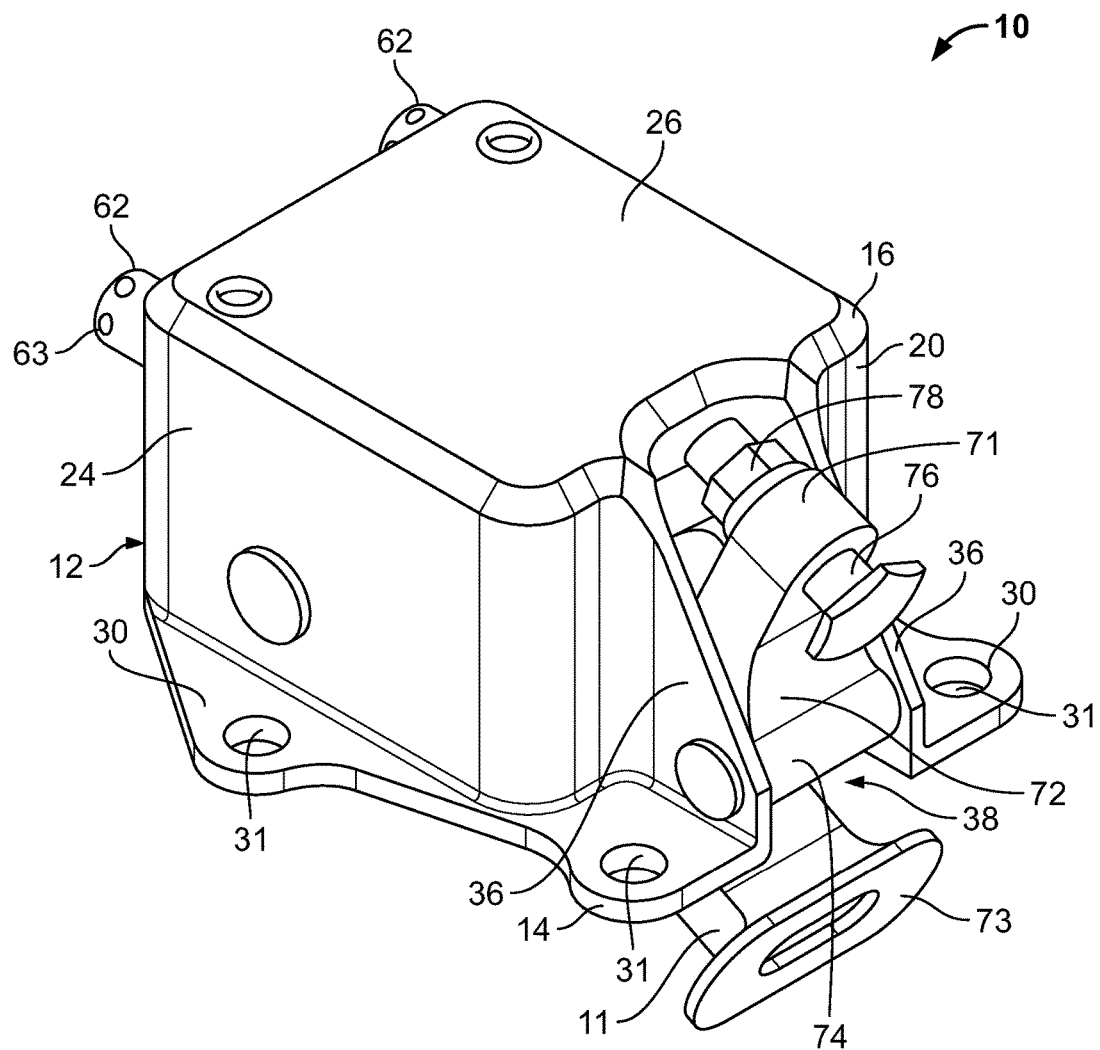
FIG. 2 is a bottom perspective view of the pressure relief latch shown in FIG. 1.
Figure 3:
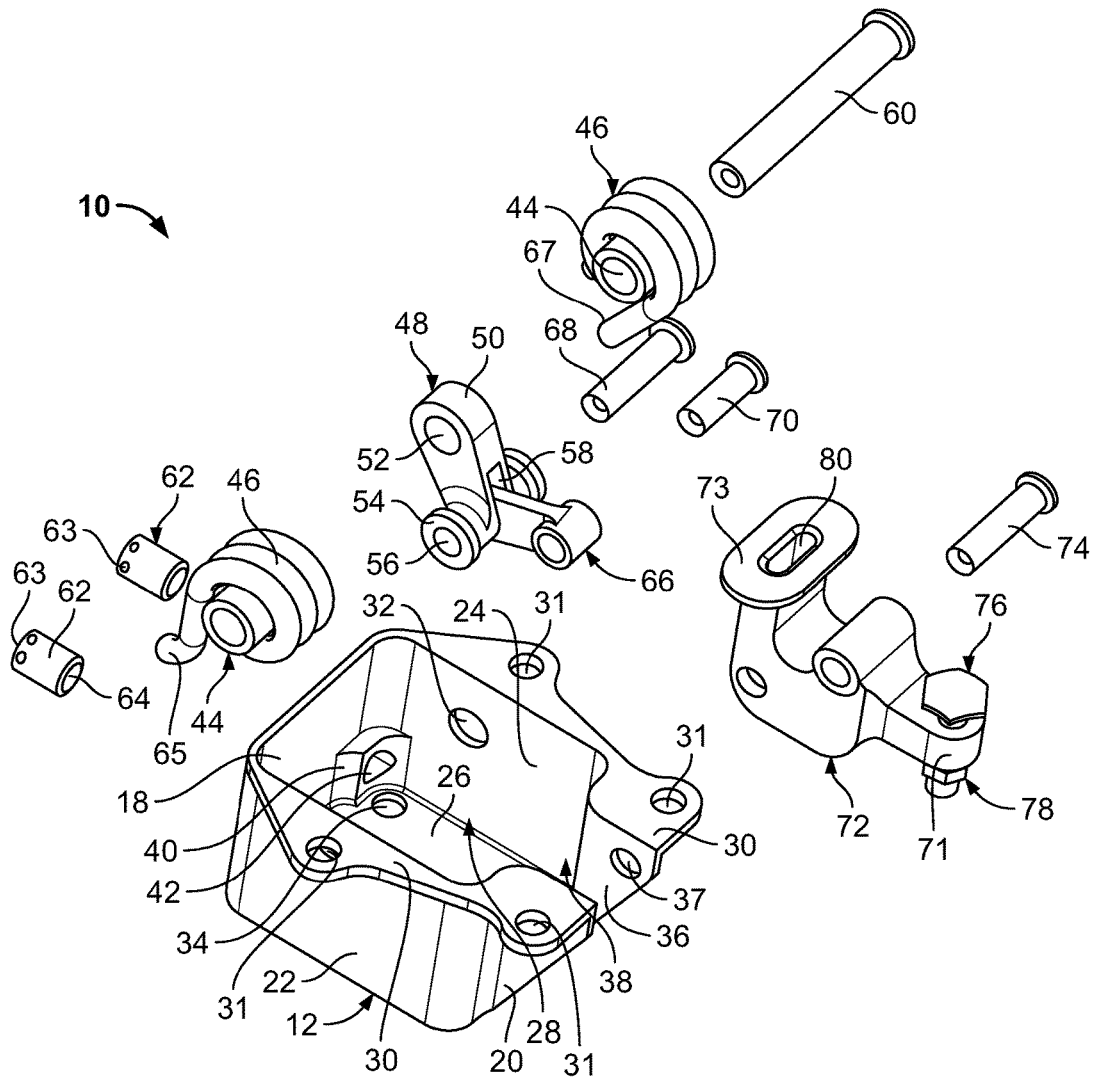
FIG. 3 is an exploded perspective view of the pressure relief latch shown in FIG. 1.

Referring to FIGS. 1 through 3, in an embodiment, a pressure relief latch 10 includes a housing 12 and a latch mechanism 11 located within the housing 12. In an embodiment, the housing 12 is generally cubed-shape and hollow. In an embodiment, the housing 12 includes a top end 14, a bottom end 16 opposite the top end 14, a front wall 18 extending from the top end 14 to the bottom end 16, a rear wall 20 opposite the front wall 18 and extending from the top end 14 to the bottom end 16, a pair of sidewalls 22, 24, each of which extends from the top end 14 to the bottom end 16 and between the front wall 18 and the rear wall 20, and a floor 26 located at the bottom end 16 and extending between the front wall 18, the rear wall 20, and the sidewalls 22, 24, all of which define an interior portion 28 of the housing 12. In an embodiment, the housing 12 includes a pair of mounting brackets 30, one of which extends outwardly at the top end 14 and the sidewall 22 from the front wall 18 to the rear wall 20, and the other of which extends outwardly at the top end 14 and the side wall 24 from the front wall 18 to the rear wall 20. In an embodiment, each of the mounting brackets 30 includes a pair of mounting holes 31, each being is sized and shaped to receive a fastener, such as a bolt, screw, rivet, or the like, for mounting the latch 10 to the structure. In an embodiment, each of the sidewalls 22, 24 includes a rivet hole 32 extending therethrough and is sized and shaped to receive a rivet, which shall be described hereinafter. In an embodiment, the floor 26 includes a pair of drainage holes 34 extending therethrough, one of which is located proximate to a corner formed by the front wall 18 and the sidewall 22, and the other of which is located proximate to a corner formed by the front wall 18 and the sidewall 24. In an embodiment, the housing 12 includes a pair of support brackets 36, one of which extends obliquely from the rear wall 20 and the bottom end 16 to the top end 14 and one of the brackets 30 and is located proximate to the sidewall 22, and the other of which extends obliquely from the rear wall 20 and the bottom end 16 to the top end 14 and one of the brackets 30 and is located proximate to the sidewall 24. In an embodiment, each of the support brackets 36 is connected integrally its corresponding one of the brackets 30. In an embodiment, each of the support brackets 36 includes a hole 37 formed therein and is sized and shaped to receive a rivet, which shall be described hereinafter. In an embodiment, an opening 38 is formed within the rear wall 20 and is positioned between the support brackets 36.

Referring to FIG. 3, in an embodiment, within the interior portion 28 of the housing 12, one of a pair of ledges 40 is located between and extends from a corner formed by the sidewall 22, the front wall 18, and the floor 26, and the other of the pair of ledges 40 is located between and extends from a corner formed by the sidewall 24, the front wall 18, and the floor 26 (only one of the ledges 40 being shown in FIG. 3). In an embodiment, a pair of threaded holes 42 is formed within the front wall 18 and extending therethrough proximate to the floor 26, each of which are located within a corresponding one of the ledges 40.

Referring to FIGS. 1 and 3, the latch mechanism 11 includes a pair of bushings 44 and a pair of torsion springs 46, which are mirrored with one another. In an embodiment, ech of the torsion springs 46 is positioned around a corresponding one of the bushings 44 and rests on a corresponding one of the ledges 40 of the housing 12. Referring to FIG. 3, in an embodiment, the latch mechanism 11 includes an arm 48 having an elongated middle portion 50 with a hole 52 and a pair of side members 54 each of which includes a hole 56, and a slot 58 formed therebetween. The bushings 44 and the springs 46 are connected rotatably to the arm 48 by a rivet 60 which is inserted through the hole 52 of the middle portion 50 of the arm 48. In an embodiment, the latch mechanism 11 includes a pair of socket screws 62 each of which is inserted within a corresponding one of the holes 42 in the rear wall 20 of the housing 12. Each of the socket screws 62 includes a plurality of holes 63 about its periphery for receiving lock wires, and a countersink portion 64. One end of a leg 65 of each of the torsion springs 46 engages with the countersink 64 of a corresponding one of the socket screws 62, while the other leg 67 of each of the torsion springs 46 reacts against the arm 48.

Still referring to FIG. 3, in an embodiment, the latch mechanism 11 includes a link 66, one end of which is positioned within the slot 58 of the arm 48 and attached rotatably thereto by a rivet 68 in a scissor-like manner. In an embodiment, the latch mechanism 11 includes a bolt mechanism 72 positioned within and attached to the zo housing 12 by a rivet 74, which is positioned within the holes 37 and extending though the opening 38 of the housing intermediate the support brackets 36. In an embodiment, an opposite end of the link 66 pivots around a rivet 70 through the bolt mechanism 72, which is inserted within holes of the link 66. The bolt mechanism 72 pivots around the rivet 74 through the housing 12. In an embodiment, the bolt mechanism 72 includes a hex bolt 76 installed at one end 71 thereof and secured by a nut 78. In an embodiment, the bolt mechanism 72 includes a slot 80 formed at an opposite end 73 thereof, which is sized and shaped to receive a tool, such as a screwdriver.

Figure 4:
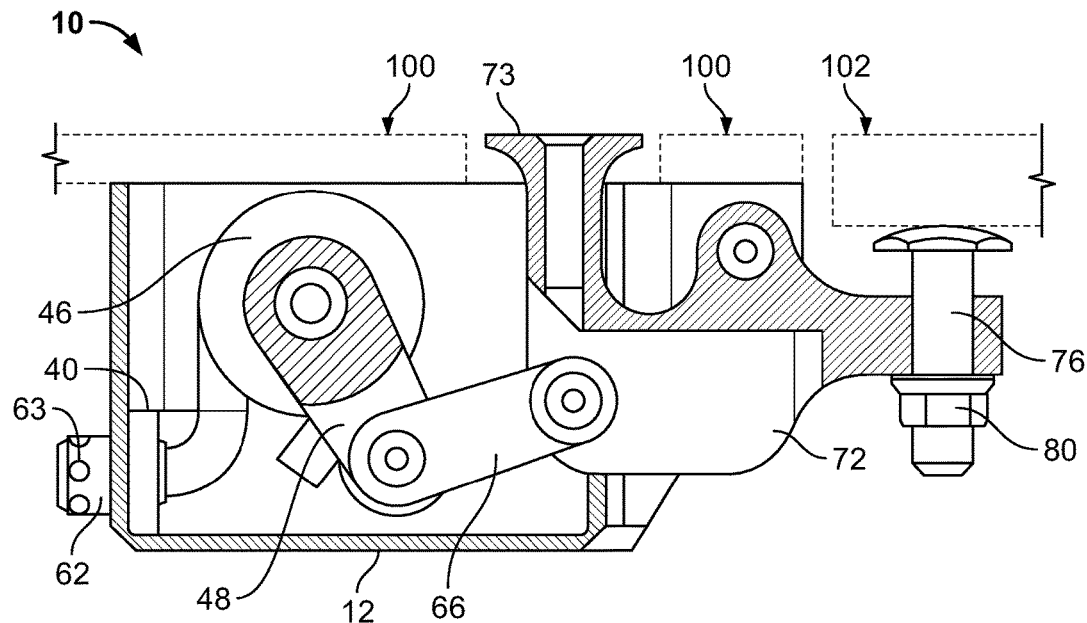
FIG. 4 is side cross-sectional view of the pressure relief latch shown in FIG. 1, the latch being shown in a closed position.
Figure 5:
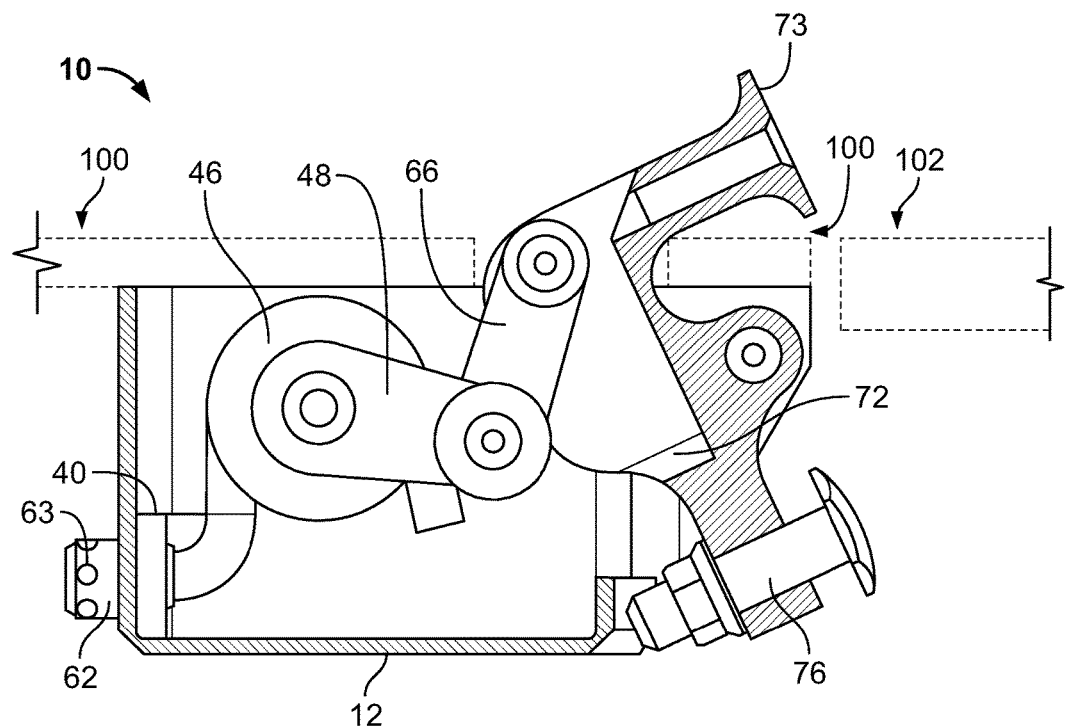
FIG. 5 is side cross-sectional view of the pressure relief latch shown in FIG. 1, the latch being shown in an open position.

Referring to FIGS. 4 and 5, in an embodiment, the latch 10 is attached to a panel 100 of a structure 102. As shown in FIG. 4, when the latch 10 is in a closed position, the arm 48 and the link 66 are toggled under a spring load from the springs 46, in which the link 66 pushes the bolt mechanism 72 to a stop by the housing 12 in a first, closed position. A load from the hex bolt 76 of the bolt mechanism 72 is applied on the structure 102. When a force on the end 73 of the bolt mechanism 72 reaches or exceeds the required load, the bolt mechanism 72 un-toggles the link 66 and the arm 48 which, in turn, disengages the hex bolt 76 from the structure 102 until the bolt mechanism 72 is stopped against the arm 48 in a second, open position. In an embodiment, each of the socket screws 62 is adapted to be adjusted independently from the other, such that turning each of the screws 62 will adjust the loads of the corresponding springs 46 and, in turn, the load from the hex bolt 76. In an embodiment, the socket screws 62 can be adjusted with a standard hex wrench or other tools known in the art. Once the applied load on each of the springs 46 is reached, the socket screws 62 can be secured in place with lock-wires through their holes 63 (not shown in the Figures). In an embodiment, the bolt mechanism 72 can be moved manually from its closed position to its open position by inserting a tool in the slot 80 thereof, such as a screwdriver, in order to manually open and close the latch 10.

It should be understood that the embodiments described herein are merely exemplary and that a person skilled in the art may make many variations and modifications without departing from the spirit and scope of the invention. All such variations and modifications are intended to be included within the scope of the invention as defined in the appended claims.

What is claimed is:

1. A latch, comprising:
a housing having a top end, a bottom end opposite the top end, a front wall extending from the top end to the bottom end, a rear wall opposite the front wall and extending from the top end to the bottom end, a pair of sidewalls, each of which extends from the top end to the bottom end and between the front wall and the rear wall, and a floor located at the bottom end and extending between the front wall, the rear wall, and the sidewalls, wherein the front wall, rear wall, the pair of sidewalls, and the floor forming an interior portion, wherein the housing includes a pair of ledges, one of the pair of ledges being located between and extends from a first corner formed by one of the pair of sidewalls, the front wall, and the floor of the housing, and the other of the pair of ledges being located between and extends from a second corner formed by the other of the pair of sidewalls, the front wall, and the floor of the housing, wherein the housing includes a pair of holes formed within the front wall thereof, one of the pair of holes being located within one of the pair of ledges, and the other of the pair of holes being located within the other of the pair of ledges; and
a latch mechanism located within the interior portion of the housing, the latch mechanism including an arm, a pair of socket screws, each of which is rotatably positioned within a corresponding one of the pair of holes of the front wall of the housing, a pair of torsion springs, each of which is rotatably and directly connected to the arm and engages a corresponding one of the pair of socket screws, wherein one of the pair of torsion springs rests on one of the pair of ledges, and the other of the pair of torsion springs rests on the other of the pair of ledges, a bolt mechanism rotatably attached to the housing proximate to the rear wall and having a first end and a second end opposite the first end of the bolt mechanism, and a link having a first end and a second end opposite the first end of the link, the first end of the link being pivotably attached to the arm, and the second end of the link being attached to the bolt mechanism, wherein the arm includes a middle portion having a pair of side members extending outwardly and opposed to one another and a slot formed between the side members, the slot being sized and shaped to receive the first end of the link,
wherein each of the pair of socket screws being adapted to adjust a load on a corresponding one of the torsion springs, and
wherein the bolt mechanism is rotatably movable between a first position, in which the arm and the link are toggled with one another under loads from the pair of torsion springs and the first end of the bolt mechanism is adapted to engage an external structure, and a second position, in which the link and the arm are untoggled with one another and the first end of the bolt mechanism is disengaged with the external structure.

2. The latch of claim 1, wherein the latch mechanism includes a pair of bushings, each of the pair of torsion springs being positioned around a corresponding one of the bushings, and wherein the bushings are connected to the middle portion of the arm by a rivet.

3. The latch of claim 2, wherein each of the pair of torsion springs includes a first leg and a second leg, the first leg of each of the pair of torsion springs engages its corresponding one of the pair of the socket screws, and the second leg of each of the pair of torsion springs engages a corresponding one of side members of the arm.

4. The latch of claim 3, wherein each of the socket screws includes a periphery and a plurality of holes formed within the periphery, each of the plurality of holes being sized and shaped to receive a lock wire.

5. The latch of claim 3, wherein the bolt mechanism includes a bolt positioned at the first end of the bolt mechanism, and a nut threadedly engaged with the bolt for adjusting a position of the bolt.

6. The latch of claim 5, wherein the second end of the bolt mechanism includes a slot formed therein that is sized and shaped to receive an external tool for manually rotating the bolt mechanism.

7. The latch of claim 1, wherein the housing includes at least one mounting bracket.

8. The latch of claim 7, wherein the at least one mounting bracket includes a pair of mounting brackets.

9. The latch of claim 8, wherein the housing includes a pair of support brackets, one of which extends obliquely from the rear wall and the bottom end to the top end proximate to one of the sidewalls, and the other of which extends obliquely from the rear wall and the bottom end to the top end and proximate to the other of the sidewalls.

10. The latch of claim 9, wherein the rear wall includes an opening positioned from the support brackets, the opening being sized and shaped to enable movement of the bolt mechanism between its first position to its second position.

* * * * *